(12) United States Patent
Boudville

(10) Patent No.: US 12,564,791 B2
(45) Date of Patent: Mar. 3, 2026

(54) GPT AND HYPERLINKS TO PROTECT WOMEN FROM ONLINE PREDATORS

(71) Applicant: Wesley John Boudville, Perth (AU)

(72) Inventor: Wesley John Boudville, Perth (AU)

(73) Assignee: Wesley John Boudville, Perth (AU)

( * ) Notice: Subject to any disclaimer, the term of this patent is extended or adjusted under 35 U.S.C. 154(b) by 280 days.

(21) Appl. No.: 18/445,281

(22) Filed: Jun. 22, 2023

(65) Prior Publication Data

US 2024/0424411 A1     Dec. 26, 2024

(51) Int. Cl.
| | |
|---|---|
| *A63F 13/75* | (2014.01) |
| *A63F 13/45* | (2014.01) |
| *A63F 13/69* | (2014.01) |
| *A63F 13/87* | (2014.01) |

(52) U.S. Cl.
CPC .............. *A63F 13/75* (2014.09); *A63F 13/45* (2014.09); *A63F 13/69* (2014.09); *A63F 13/87* (2014.09); *A63F 2300/5566* (2013.01); *A63F 2300/5586* (2013.01); *A63F 2300/572* (2013.01); *A63F 2300/8082* (2013.01)

(58) Field of Classification Search
None
See application file for complete search history.

(56) References Cited

U.S. PATENT DOCUMENTS

| 8,827,816 B2 | 9/2014 | Bhogal et al. |
|---|---|---|
| 10,627,983 B2 | 4/2020 | Bates et al. |
| 10,679,411 B2 | 6/2020 | Ziman |
| 11,853,470 B2 | 12/2023 | Boudville |
| 2005/0137015 A1* | 6/2005 | Rogers .................... A63F 13/12 |
| | | 463/42 |
| 2007/0150340 A1 | 6/2007 | Cartmell |
| 2007/0162862 A1 | 7/2007 | Ogasawara et al. |
| 2009/0174702 A1 | 7/2009 | Garbow et al. |
| 2013/0288788 A1 | 10/2013 | Lim et al. |
| 2016/0279522 A1 | 9/2016 | De Plater et al. |
| 2016/0283096 A1 | 9/2016 | Yao et al. |
| 2018/0154106 A1 | 6/2018 | Sánchez Vives et al. |
| 2021/0275928 A1* | 9/2021 | Ashoori ........... H04N 21/26603 |
| 2021/0327140 A1 | 10/2021 | Rothkopf et al. |
| 2022/0032199 A1* | 2/2022 | Rudi ...................... G06N 20/00 |
| 2022/0096937 A1* | 3/2022 | Dorn ...................... A63F 13/79 |

(Continued)

OTHER PUBLICATIONS

Non-final Office Action for U.S. Appl. No. 17/803,375, filed Jun. 6, 2022 on behalf of Wesley John Boudville. Mailed Oct. 4, 2023. 34 pages.

(Continued)

*Primary Examiner* — Jason T Yen
(74) *Attorney, Agent, or Firm* — Steinfl + Bruno LLP

(57) ABSTRACT

We combine using GPT with hyperlinks to protect women from online sex predators. The women might be visiting a Metaverse site. Or playing a game in a non-Metaverse site. A priority is to use hyperlinks attached to virtual underwear. The links go to a punishment site. A predator who gropes a female character or avatar is sent there. Lesser acts can be rude gestures, rude spoken words, rude written text. GPT is used to detect these. Remedies include a blurring of rude gestures or a redacting of rude text, or deforming a limb if the limb is used to make a rude gesture. Another use can be to detect a Predator showing the sole of its shoe to another avatar.

16 Claims, 10 Drawing Sheets

(56)             References Cited

U.S. PATENT DOCUMENTS

| | | |
|---|---|---|
| 2022/0345537 A1 | 10/2022 | Samms et al. |
| 2022/0351281 A1 | 11/2022 | Morgan et al. |
| 2023/0014321 A1* | 1/2023 | Nair ........................ G10L 25/51 |
| 2024/0066409 A1 | 2/2024 | Boudville |
| 2024/0281518 A1 | 8/2024 | Boudville |

OTHER PUBLICATIONS

Non-final Office Action for U.S. Appl. No. 17/803,559, filed Aug. 30, 2022 on behalf of Wesley John Boudville. Mailed Jul. 18, 2024. 9 pages.
Non-Final Office Action for U.S. Appl. No. 17/803,559, filed Aug. 30, 2022 on behalf of Wesley John Boudville. Mailed Feb. 7, 2025. 8 pages.

* cited by examiner

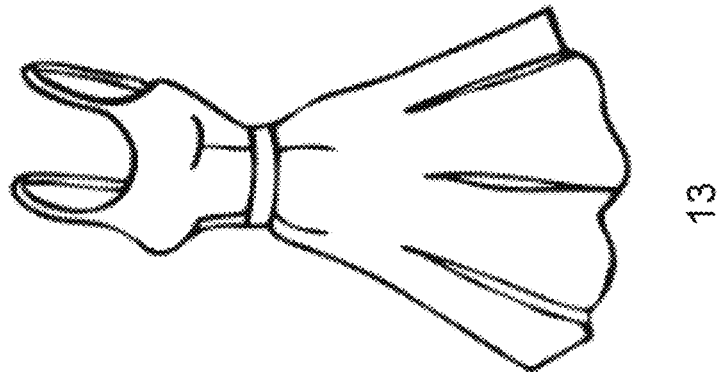
13
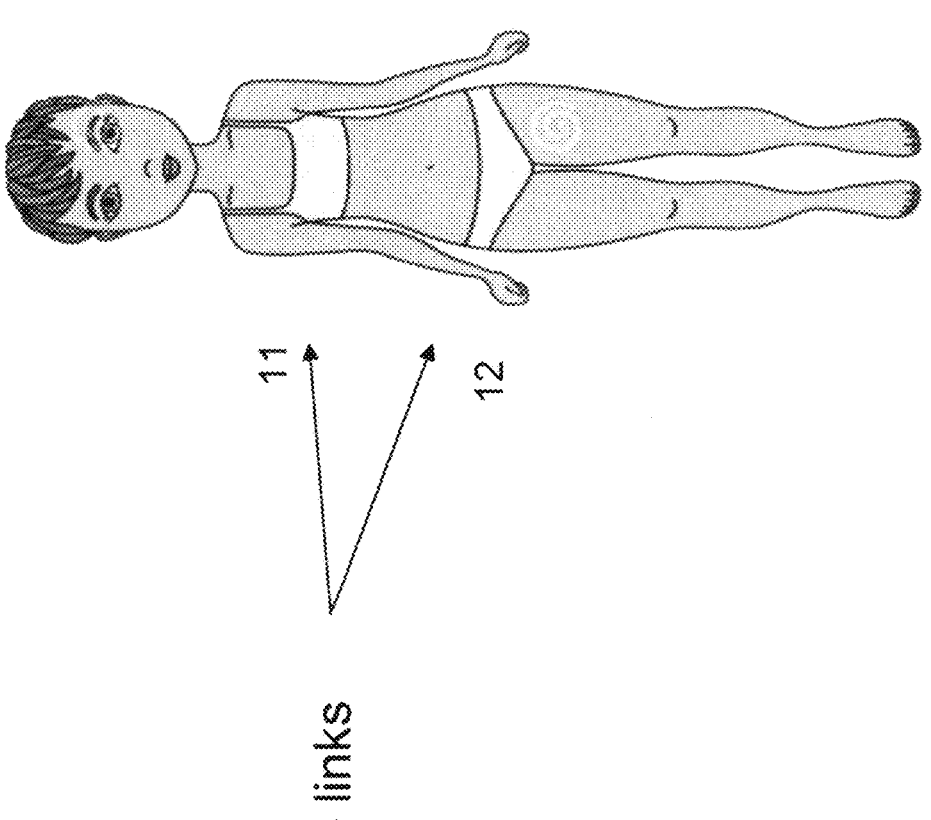
Clickable links
11
12
Figure 1

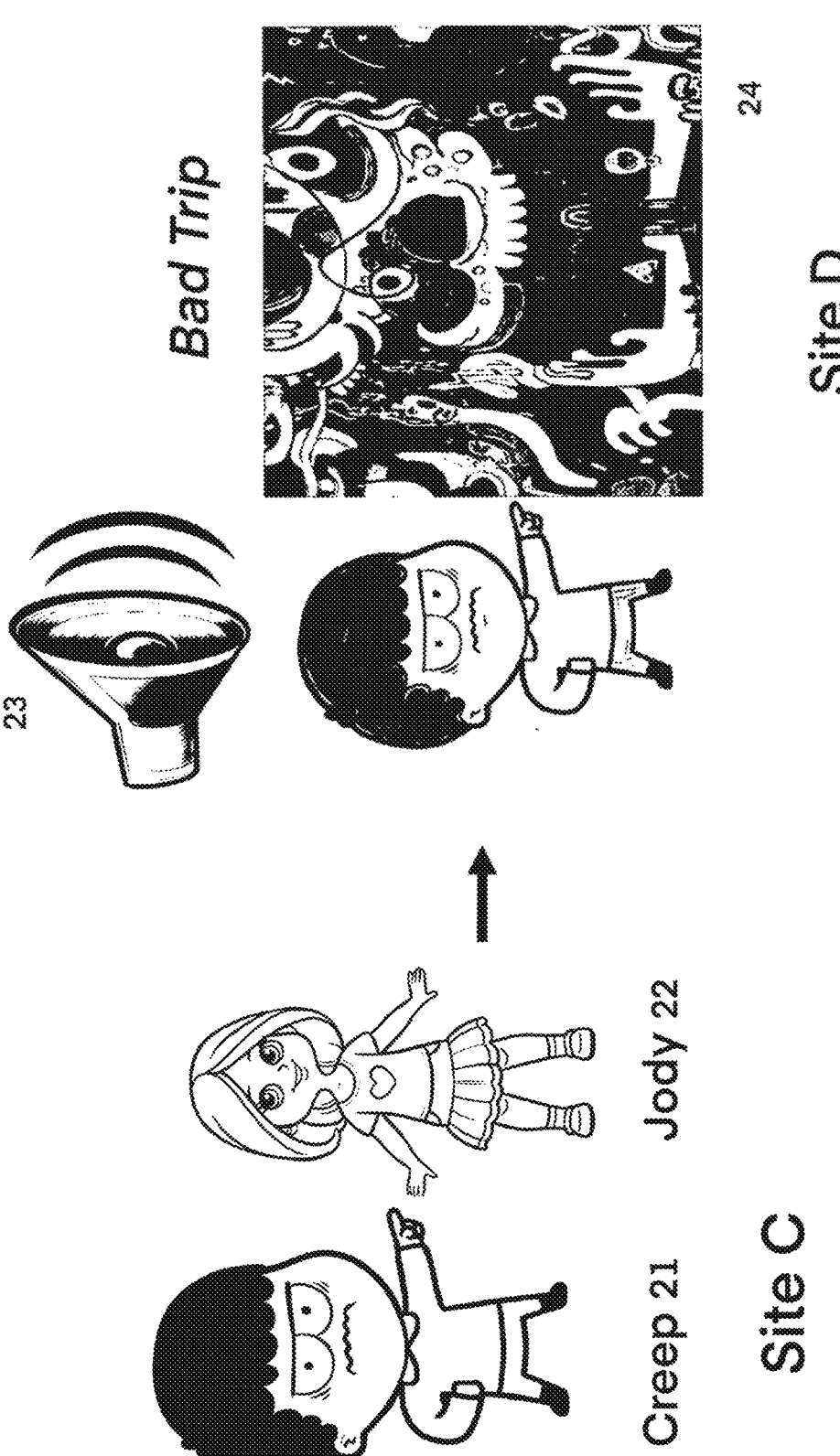
Figure 2     Girl's Top is a Clickable Link

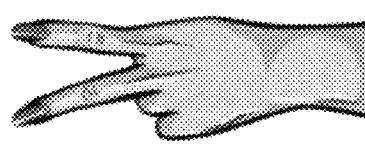
4c – UK, Australia
4b
4a – Greece, Turkey
4d – Middle East
Figure 4    Offensive gestures

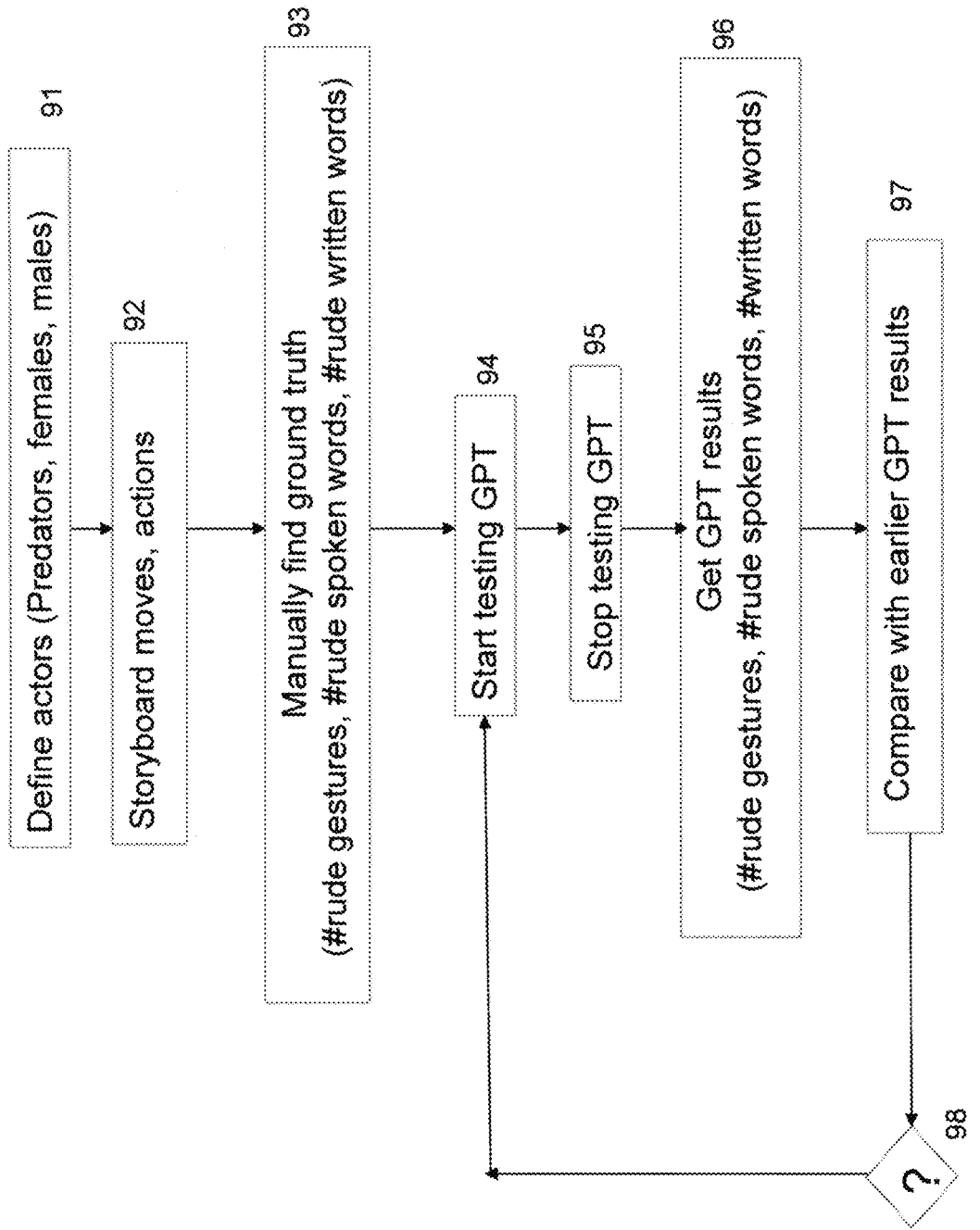
Figure 9    Calibration of GPT

GPT AND HYPERLINKS TO PROTECT WOMEN FROM ONLINE PREDATORS

BACKGROUND

Various types of Generative Pretrained Transformer (GPT) have recently become prominent for improved Artificial Intelligence (AI). Chat GPT is a product of OPEN AI Corp. In this application, we use GPT as a generic lapel for AI products from that firm as well as similar products from competing firms like APPLE, IBM, GOOGLE, MICROSOFT. Separately, we filed several patent applications to fight sexual predators in the Metaverse. The earlier methods we developed used hyperlinks against the predators.

BRIEF DESCRIPTION OF THE DRAWINGS

FIG. 1 shows an avatar in her underwear, with hyperlinks to a punishment site.

FIG. 2 shows the Predator sent to a punishment site, where audio and video are shown.

FIG. 4 shows examples of offensive gestures made by a Predator.

FIG. 9 shows a calibration of GPT.

DETAILED DESCRIPTION

Figure 2A:
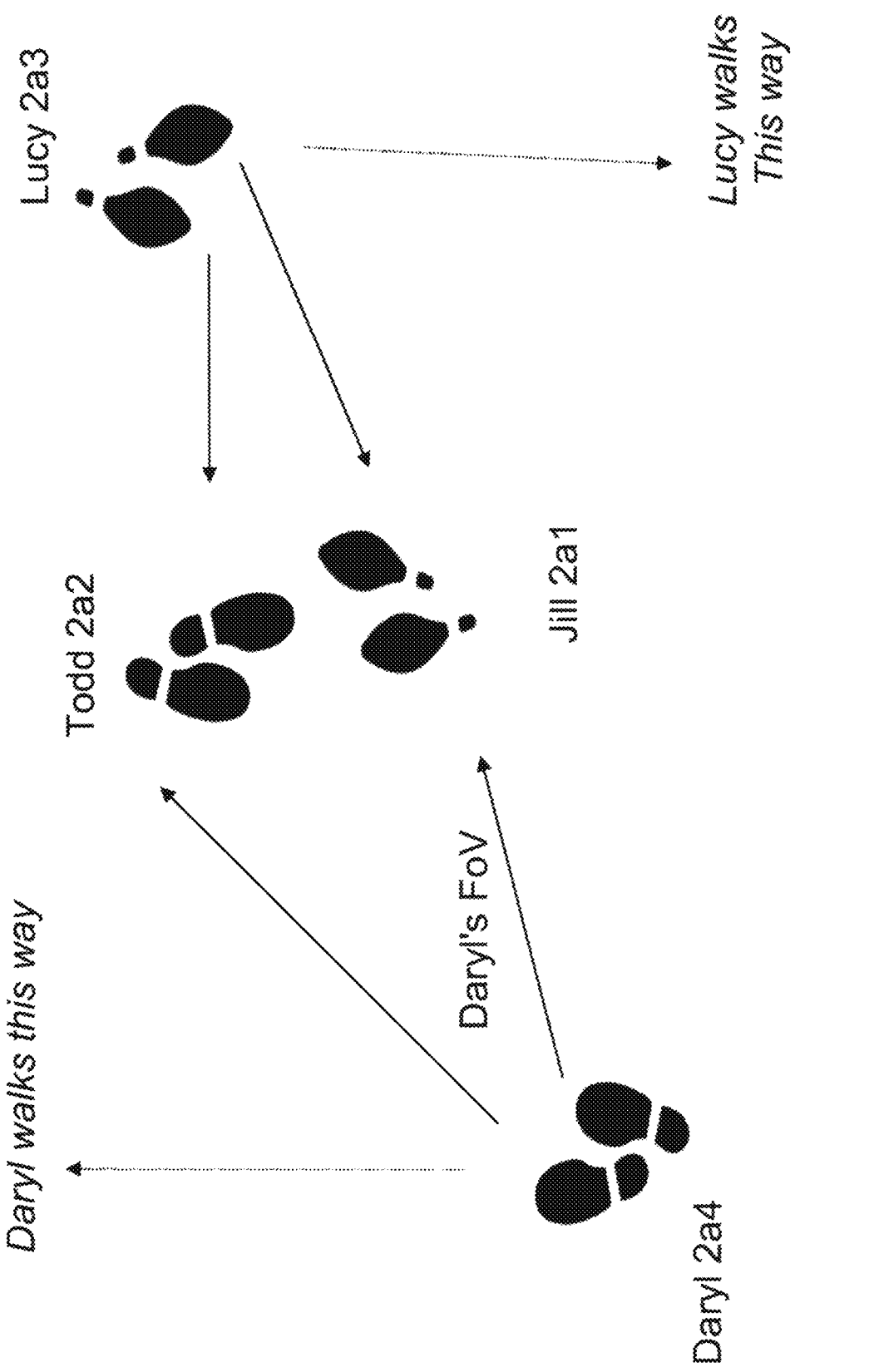
FIG. 2a shows 2 monitor avatars walking near a Predator and victim.

What we claim as new and desire to secure by letters patent is set forth in the following.

Our work can be applied to the Metaverse. By this, we take the Metaverse to be Virtual Reality (VR) plus the use of avatars within VR. But our work can also be used in more general online applications, like gaming, where there might not be any requirement for a full VR approach or a need for a Heads Up Display (HUD) rig that is immersive. So ours can used for a user in front of a PC or laptop, and running a browser on it.

This application has the sections:

0] Our previous work;
1] Using hyperlinks;
2] Using GPT;
3] Finding Predators about to grope;
4] Predator sent to punishment site;
5] Calibrating a site that uses GPT;
6] Generalizing;

0] Our Previous Work

In recent patent applications, we described various countermeasures that can be taken to protect women. application Ser. No. 17/803,218 "Metaverse avatar wearing a clickable link" put a clickable hyperlink on the surface of an avatar or on her clothing. The link went to a second site. If a Predator touched the link, he is "Jumped" (=transported) to the second site. application Ser. No. 17/803,359 "Metaverse anti rape measures—part 2" described where a female avatar can have a link from her bra to a second site. And a link from her panties to the second site. When the Predator touches either, 3 things happen.

First. The Predator is immediately separated from the victim, giving her protection from him.

Second. At the second site, audio and video are shown to him. The audio might be of fingernails on a blackboard. Video can be of (eg) an unpleasant and nauseous experience. The audio and video make a deterrent to the human operating the Predator, to discourage him from future acts.

FIG. 1 shows an avatar in her underwear—bra and panties. With hyperlinks from these to a punishment site. The reader is undoubtedly familiar with using a web browser, that shows a webpage with links in it. And that by clicking a link, the reader is sent to the webpage pointed to by the link. The use of a link in the current application follows this prior usage. Except that in the Metaverse, a Predator avatar is used. And where when a first user (the Predator) touches a second user (the victim). We assume that the Predator takes on male form, and the victim takes on female form. (But this can be varied.)

Thus we refer to the Predator using "he" and "him", and the victim using "she" and "her".

FIG. 2 shows the Predator being sent to a punishment site, where audio and video are shown to him.

Third. Countermeasures can be done to hamper the Predator hitting the equivalent of a Back button on the HUD rig worn by the operator of the Predator. So the Predator trying to go back to the first site can be delayed. This gives more time for the female avatar to leave the first site. Or for the site to prepare other measures to use against the Predator when or if he eventually does return to the first site.

1] Using Hyperlinks

Below, we define the "first site" as the site that the user first appears in.

Suppose an avatar does not have hyperlinks from its underwear to a punishment site. When it appears in a first site (VR or online), the site can ask it (which of course really means the site asks the owner of the avatar) if it wants protective hyperlinks. Motivated perhaps by these being defenses against predators who sexually harass. By answering yes, the avatar (=owner of the avatar) consents to such hyperlinks being made from her virtual underwear.

She might only want the hyperlinks to be made for some items of her underwear. Eg. Only for panties, and not for a bra. The softwear at the site can get a list of her underwear from her. Perhaps by a simple query of the avatar's data. There might be more than 2 items of underwear.

In this section, we discuss how a Predator who meets our hyperlinks might try to evade. See FIG. 2a. It shows female Jill 2a1 standing near possible Predator Todd 2a2. He has not done anything untoward. But in an earlier existence (possibly as a different Predator), he was caught by our hyperlinks. He might now try a different approach. This assumes that we are in a VR environment. He now plans to look away from Jill when he gropes her. Or perhaps he might close his eyes. The idea is to have his incoming vision not showing him looking at her. This will not refute the use of our hyperlinks acting on his action. But in a post mortem done by a site reviewer, she will not find visual evidence of him looking at Jill when he gropes her. The human Predator might use this to argue a lessening of the evidence against him.

A countermeasure is to have one for more characters/avatars walking or watching Todd and Jill. Like Lucy 2a3 and Daryl 2a4. Collectively, we call them "Watchers". Lucy might be shown walking in the downward direction in the Figure. While Daryl walks in the upward direction. Both try to keep jill and Todd in their Fields of View. So if Todd does grope Jill while looking away, one or both of Lucy and Daryl will have images of Todd and Jill. This can be used as extra corroborating evidence of Todd's malign intent.

FIG. 2a shows current Fields of View of Lucy and Daryl.

Note that it can be a simple matter for Lucy and Daryl to be controlled by software that makes the above largely automatic. Lucy and Daryl's software needs collision avoidance built in. Where the avoidance is to avoid colliding with any avatars in the room. There might be more figures present than the 4 shown here.

Then extra effort needs to be done to largely keep users' characters to be observed. More than 2 observers could be used, especially if there are more regular users than just Todd and Jill in the room.

2] Using GPT

We use GPT as synonymous with accessing a Large Language Model (LLM). There has been much recent publicity about ChatGPT. It was released globally and many used it to do research on a topic they described to it in a short text. Speculation has been rife about how it might help various people in their jobs. As Wolfram stated, much about how it works is a black box. And 'human language (and the patterns of thinking behind it) are somehow simpler and more "law like" in their structure than we thought'. (Ibid.) A practical problem is that we do not understand the inner workings of how the LLM neural net is altered to enable this in its billions of elements. At the lowest level, we might. But at a higher level, spanning the billions of such elements, it remains a mystery.

This leads to a problem if we want to make an invention using GPT. Of necessity, we have to somehow describe a system where the inner workings are a black box. We focus on using GPT to combat sexual harassment of (mostly) women in the context of online usage.

Harassment need not be sexual. It could be unwanted touching of some parts of the body. Imagine a Predator doing this to an avatar's or user's arms. The detection of this can be done by using GPT to survey users' inputs. Then in future uses of the first site, when an avatar appears, it can be told about this and asked if the first site can add a countermeasure. This might be then that part of the avatar's body has a hyperlink added. This might lead to a Predator who touches that part of the avatar to be sent to the punishment site.

Or there could be a gradation of punishments. At one extreme might be no punishment. Here, the first site adds a protective "bandage" over that part of the avatar's or user's body. The bandage might be invisible. Thus the recipient will not "feel" the Predator's touch. This bandage acts to prevent the avatar from feeling an unwanted touch on her body. (This assumes that the avatar has implemented a haptic technology so that she can "feel" the touch on her.)

This can be taken much further. In our earlier applications, our methods of protection focused on defending against a Predator's groping. We considered the Predator's groping actions to be more dangerous than any non-groping actions or gestures or spoken words.

Figure 3:
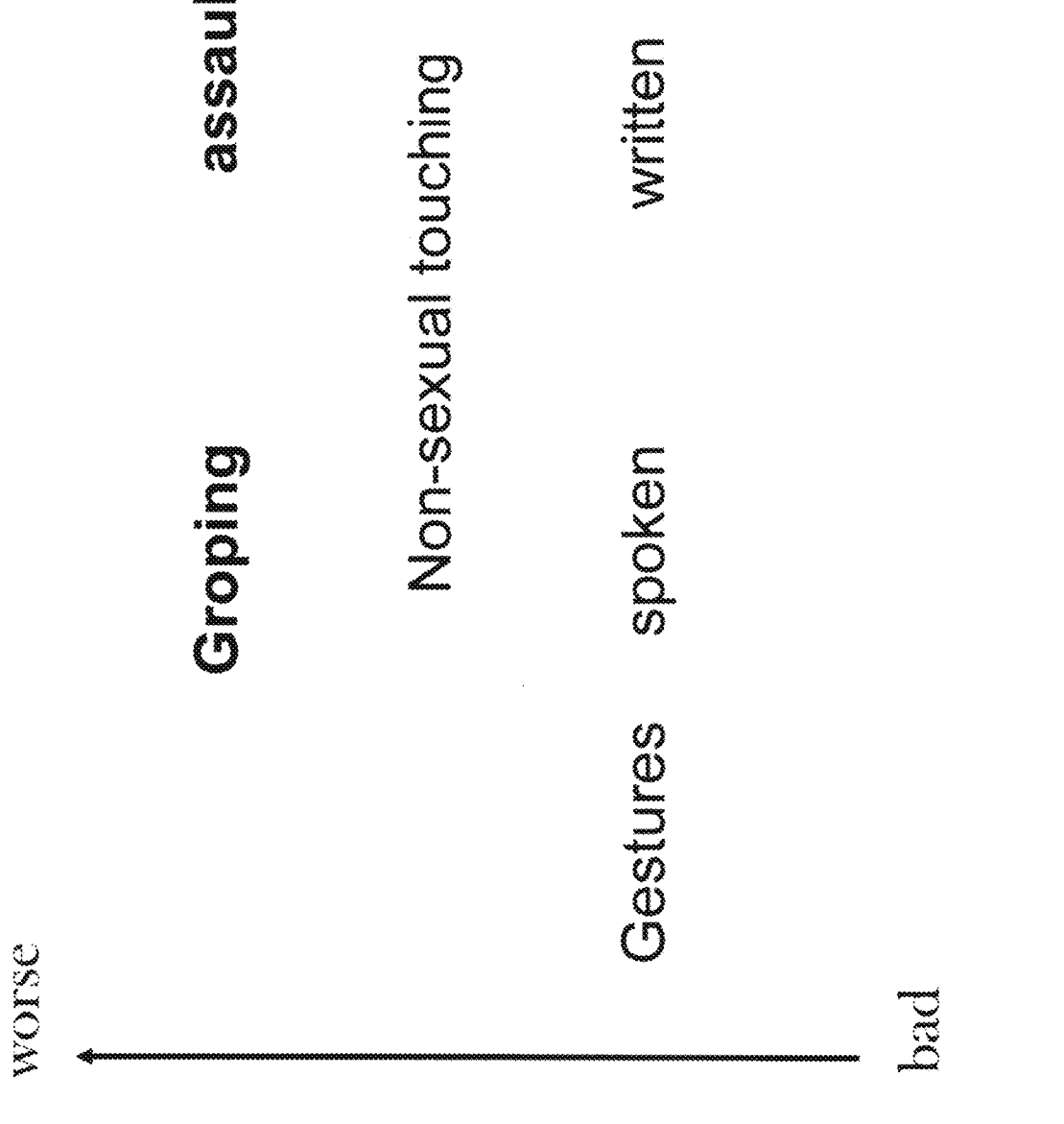
FIG. 3 shows a gradation of offenses against an avatar.

FIG. 3 shows a hierarchy of offenses possible by Predators online. At the top is groping (by which we mean unwanted sexual touching) and assault. Our earlier applications dealt with these. Below these are non-sexual touching, rude gestures and rude spoken words. We understand that the relative ordering of the last 3 may be rather subjective.

For GPT to find gestures, rude or not, can require that in training the GPT to recognise images (including video). This has proved a successful approach recently. It needs some amount of manual tagging of images. In future, advances in understanding GPT could reduce the amount of manual effort.

Also, rude gestures can be culturally relative. FIG. 4 shows examples. Item 4a is offensive in Greece and Turkey. So a site online that is hosted in Greece or which has many visitors from Greece might consider item 4a as offensive. In contrast, item 4b (Churchill's V for Victory sign facing the viewer) might be considered inoffensive globally. But item 4c, facing the viewer, is offensive in UK and Australia. Gestures are not limited to hands. In this application, we take "gestures" to include the use of feet. Item 4d (showing the sole of a shoe to the viewer) can be considered offensive in the Middle East.

The GPT can be trained on various training sets. (One might be of users from a given region or country.) If users identify certain gestures, statements, actions, as offensive, then these can be detected in future runs of the site. Countermeasures can be taken, including blurring the gestures. Or, in extremis, an outright deletion.

Figure 5:
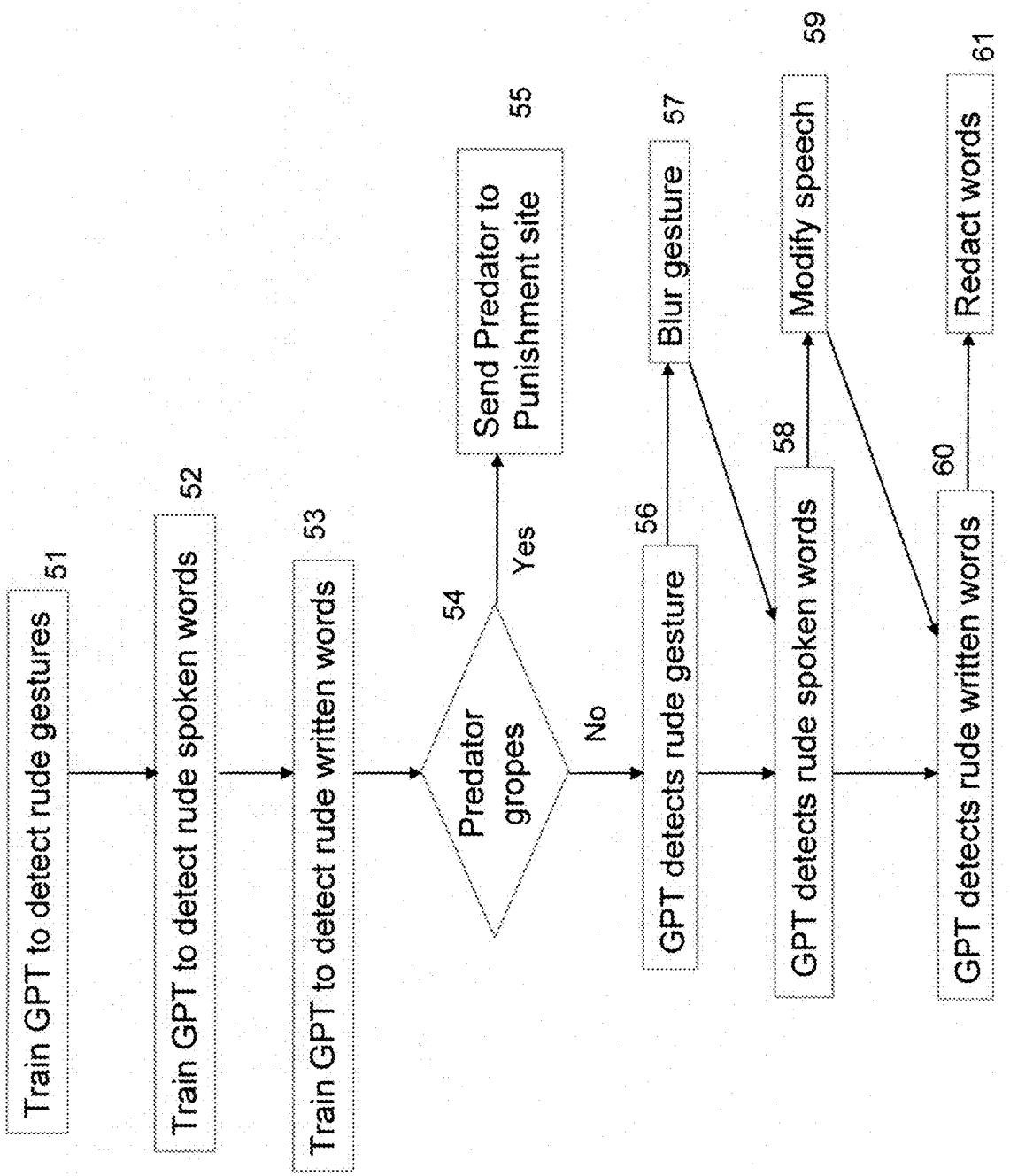
FIG. 5 is a flow chart of GPT and hyperlinks used against a Predator.

FIG. 5 can be considered a leitmotif of this application. FIG. 5 shows a method or system of combining hyperlinks and GPT to fight against sexual Predator avatars in the Metaverse. It is also generally applicable against Predators in online gaming and similar multiuser enterprises.

For offensive vocalized (spoken) speech, this can be suppressed, but real time considerations may act to hamper this. In contrast, a user doing an offensive gesture can have that gesture blurred shortly after it is commenced. Since typically such a gesture happens over several seconds. So few if any can see it during most of its duration if the gesture is suppressed.

For printed speech (eg. in a chat box typed by the user), the box's contents can be redacted. Or a milder action can be that the written text is "adjusted" to have several letters changed or just shown but with a ~~strikethrough.~~ . The choice of which action to be taken against written speech can vary, perhaps depending on the age of the recipients. Eg. for kids, a stricter action can be done. Or depending on the severity of the (eg) swearing. Or depending on the audience. Eg. A US Mormon audience might warrant a stricter policing to reduce written or spoken invective, as Mormons are well trained to minimize themselves saying such invective and to minimize, however they can, listening to such sounds. These changes might require a modification of the GUI widgets in which the written text is shown.

For the special case of a site being a VR site, stronger censorship methods can be used. For example, suppose an avatar is showing an offensive hand gesture, like items 4a or 4c. If the site can control the avatar, it might paralyze the arm that is making the gesture. The duration of this paralysis can be up to the site. Perhaps the site can post what the durations might be. Or his arm might be shown as deformed/disfigured. This acts as punishment and embarrassment.

Or suppose the Predator is showing the sole of a shoe to another avatar, and GPT detects this. It might remove that shoe from the Predator. Maybe remove both shoes. This deliberately can inconvenience the Predator or embarrass him. For the specific case of the Predator using his shoe/s, the removal has the benefit to the system that the Predator can still plod along in the site. So his awkwardness can be used as an object lesson to him and others so inclined.

Item 51 is the training of GPT against rude gestures, like those in FIG. 4. Here, the training can happen against examples of video cartoons, live action video etc. As well as trained against still images.

Item 52 is the training of the GPT against a corpus of recorded text. While item 53 is the training against a corpus of written words. The latter is currently (May 2022) a test bed used by Open AI. The order in which items 51 to 53 are done is immaterial.

Item 54 is where the Predator is detected groping another avatar, typically a female avatar. The detection can happen when the Predator touches, for example, underwear worn by her. The clothing has a hyperlink connected to a punishment site. The touching triggers the sending of the Predator to that punishment site. The touching and the resulting sending of the Predator are automatic actions. They are deterministic in the typical sense of the latter word as commonly used in computer science and electrical engineering.

We are considering quantum mechanical effects as outside the purview of this application. The reason is that physicists typically use "deterministic" in a different meaning than in computer science.

If the Predator does not grope, we arrive at item 56. If the GPT detects a rude gesture, it does item 57. It can blur the gesture. This uses a common case that the rude gesture will visibly persist long enough, for several seconds, so that the GPT can detect it. And it can do a visual blurring of, say, the Predator's hand or arm that does the gesture. In VR, the GPT can act thru modding the visuals seen by several or most of the avatars in line of sight of the gesture.

So the Predator's offending hand or arm can appear blurry to the victim and to other avatars nearby. But to the Predator, his hand or arm might appear unchanged. Alternatively, the GPT might also blur what the Predator sees of his limb. Perhaps to maintain consistency between the visuals seen by different avatars.

Another variant might be to deliberately shown the Predator's limb to him as deformed or deficient in some (repulsive) manner. This can be construed by him as a punishment on him. Since the Predator was using his limb to form a rude gesture, it is appropriate (and just) to show it as deformed, in punishment.

If the Predator and victim are in some type of combat game, then if GPT detects rude words or gestures by the Predator and imposes a handicap on the Predator's character, this can significantly degrade his fighting ability. Thus this can act as a germane and effective deterrent to him.

Another issue is if computer shows a Predator's limb as deformed (or just somehow altered), how long should this occur? One way is to look at any complaints made about the Predator. If numerous, then his limb remains deformed for longer. And other limbs, like his legs, can be made to be handicapped. Perhaps to an extent that he cannot easily move around.

Suppose the Predator leaves the site and, say, days later returns. The site might outfit the Predator with a legacy handicap, depending on the severity of his previous offenses.

This can also happen if the site's GPT identifies the current Predator as being run by the same human who ran previous Predators, on the current site or other sites. Here, we are expanding the GPT's diagnostic abilities to be shared across sites, with other diagnostic engines on other sites, whether these are GPT-type or not. The intent here is to make it harder for a player to abandon a previous Predator and to "wear" a newly made up character.

Item 58 is where the GPT detects rude spoken words. Item 59 is where the computer alters the Predator's speech to perhaps mumble his output. The mumbling is a deliberate degradation of his performance, to make him appears perhaps clumsy or uncouth. Or the computer can suppress several seconds of his speech. Here, the enforced silence can act as punishment. Plus, the computer might make the Predator's face appear deformed, to act as a further deterrent to other users to be close to the Predator.

Item 60 is where the GPT detects rude written words. Here, this output might appear in a text bubble near the Predator. Or in a chat output box associated with the Predator. The exact output modality will depend on the choices made available to the user of the Predator. This scenario is simpler than that of the spoken words. Here, the written words will persist for several seconds. The computer can redact to the limits that are possible by the spoken output means.

One case is where the computer is able to write a strikethrough over the Predator's text. So if the Predator wrote "Nonsense, girl" (where girl refers to the victim), the computer might mod it to "~~Nonsense, girl~~ ". Or the computer might change the output to "xxxxxxxxxxx". The choice of whether the strikethrough appears instead of "xxxx" might depend on what the Predator originally wrote. If the latter was a profanity and the victim is (eg) a 10 year old girl, maybe the "xxxxxx" will appear. But if the victim is an older woman, the computer might deliberately show the profanity with a strikethrough, under the assumption that she will not be (too) offended.

Figure 6:
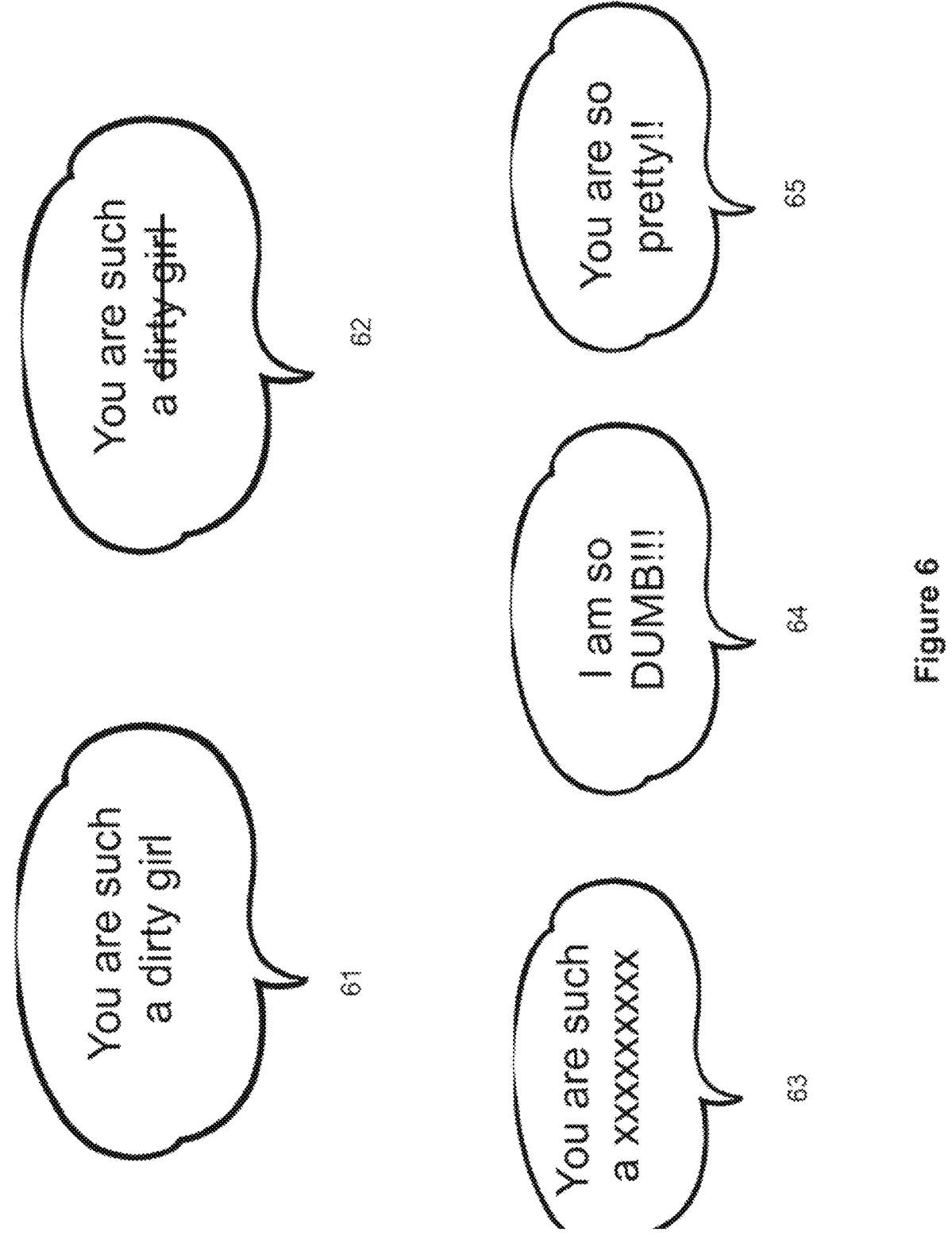
FIG. 6 shows GPT modeling a Predator's written output.

FIG. 6 shows examples. Item 61 is the Predator's original text—"You are such a dirty girl". Item 62 is a modded strikethrough—"You are such a ~~dirty girl~~ ". We are using the GPT to detect "dirty girl". Item 63 has a fully cancelled out text—"You are such a xxxxxxxxx". While item 64 has the Predator's text altered to poke fun at the Predator himself—"I am so DUMB!!!". Item 64 is the equivalent of what we suggested earlier for a countermeasure against a GPT-detected rude gesture in item 4*d*. We offered a removal of the offending shoe, to make the Predator look clumsy and ridiculous.

GPT can be used for more than just detecting (eg) "dirty girl". As FIG. 6 describes, there might be 3 possible replies, in items 63, 64 and 65. GPT can be used to decide on what type of reply. Item 63=a censorship. Item 64=a humiliation of the Predator. Item 65=the Predator appearing ridiculous. And then GPT might find a specific reply within one of these categories.

Item 65 is a different approach. Here we have the computer write a compliment to the victim. We are turning around the Predator's intent of insulting her.

While FIG. 6 shows this for written text, it should be clear that if the computer can do FIG. 6 via using GPT, it can similarly do corresponding output for transcribed spoken speech. Imagine while reading the examples in FIG. 6 that you are hearing spoken output.

Figure 7:
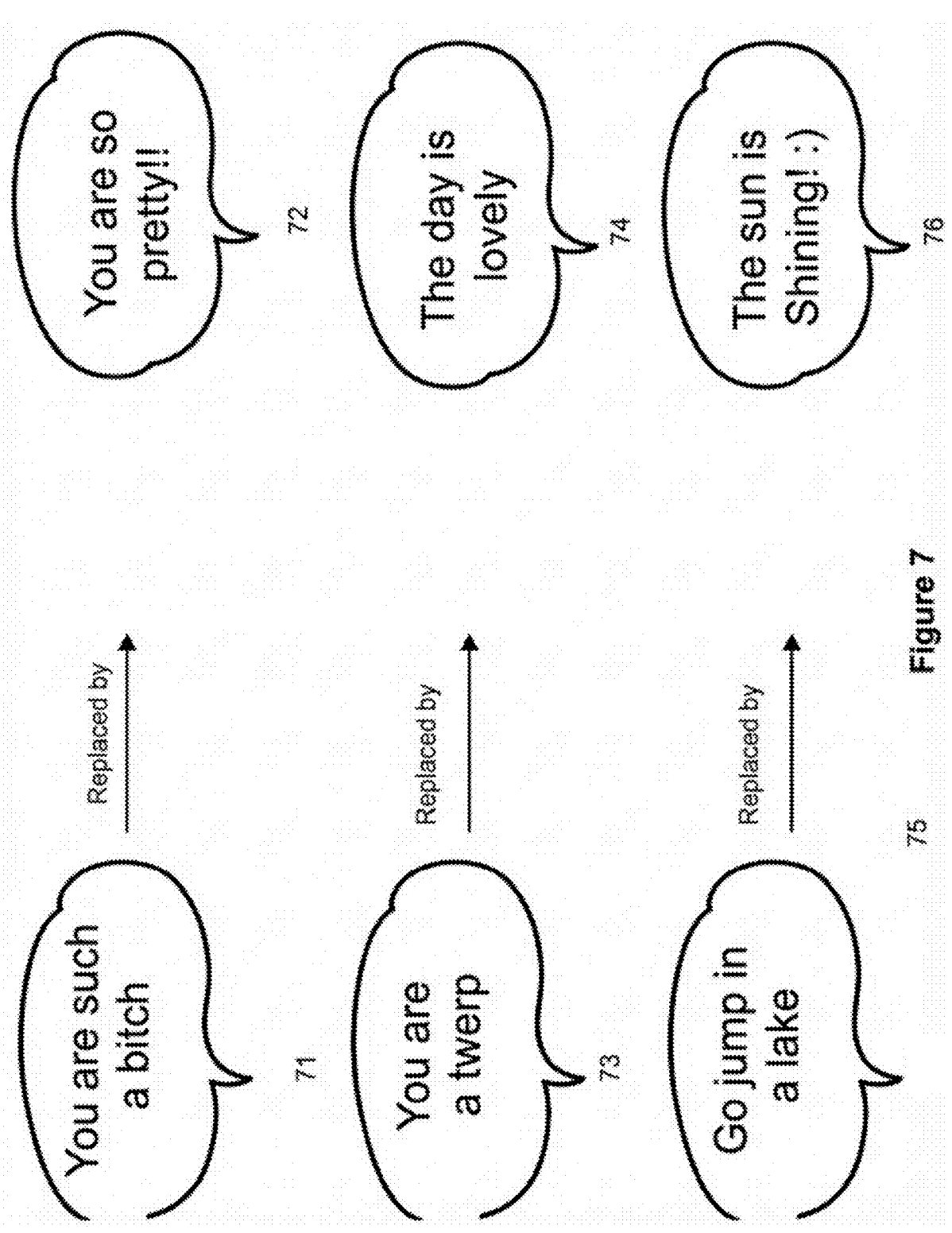
FIG. 7 shows GPT replacing a Predator's written output with innocuous statements.

FIG. 7 expands the discussion of FIG. 6. In FIG. 7, items 71, 73 and 75 are successive texts written by a Predator to insult a female. But what is shown to her are items 72, 74 and 76. Here the method is to replace each insult with an innocuous assertion by the Predator. An idea is that when he sees this happening, eventually he will get tired and move away. Note that part of the appeal to the Predator is when he sees his insults appear in written form. So when this does not happen, we take away his pleasure. This acts as a disincentive to him. Another good feature of FIG. 7 is that it reduces the potential offending of the 'victim'. So she is not discouraged from taking part in the multiuser interactions.

3] Finding Predators about to Grope

In item 54 of FIG. 5, we showed how if the Predator gropes a female, this is detected because he touches a hyperlink. Now the use of GPT gives a new possibility. When the Predator triggers the hyperlink, the GPT can surveil the video around this incident. Though first priority is to activate the link and quickly send the Predator to the punishment site. After the latter is done, or perhaps in a parallel thread, the GPT can be trained on the video. Here, there might be plural videos, recorded at different vantage points or at different orientations. The intent is to (try to) discern any "tells" that indicate an incoming grope.

To be sure, by following the video, the GPT can see the Predator's hand approach the female's underwear, right up to the point where his hand touches it. But the value can be in finding predictors as early as possible. Maybe for a given Predator, before his groping hand touches her underwear, there is a subconscious twitch of his other hand near the side of his body, for example? If such behaviour can be verified across multiple groupings, this can be valuable in predicting future actions.

Suppose we can indeed find such a tell. What can be done with it? If we assume that the site's Terms of Service are suitably written, we can use the detection of the tell to initiate the actions we would take against the Predator if he had actually groped. By doing this pre-emptively, we can reduce a trauma experienced by women who would have been groped.

This does require a training of the GPT on females who do get groped. But those females have the Predators punished. And future females are protected by combining GPT with hyperlinks.

Figure 8:
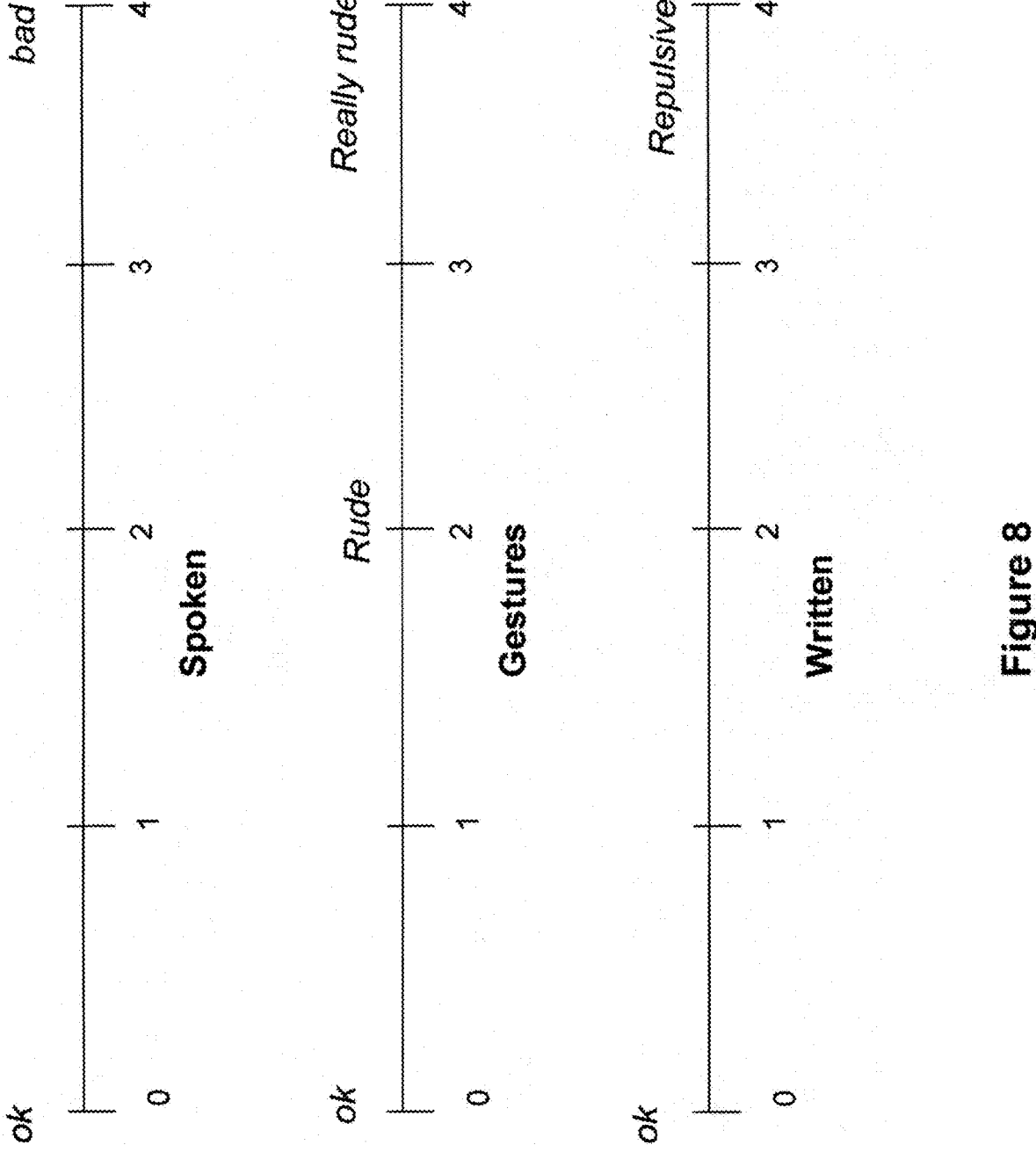
FIG. 8 shows a grading of spoken, written and gestural offenses.

FIG. 8 shows results of GPT applied to assess a site according to gestures, spoken word and written text. For each of these, GPT finds quantities of such actions. Each type of action might be summed up, ranging from (eg) "ok" or 0 to "really rude" or "repulsive". The reader can appreciate that such labels can be subjective. And, for example, one instance of a "really rude" gesture by a Predator might be considered worse than the Predator making 4 "rude" gestures.

FIG. 8 assumes that GPT can be used to derive such approximate quantities automatically, compared to having human monitors of a site doing this manually.

4] Predator Sent to Punishment Site

In a recent patent application, "Swapping Predator and victim in the Metaverse", Ser. No. 17/803,991, filed 21 Feb. 2023. we described how a Predator was detected in a first site, groping a female avatar. He is sent to a punishment site. A novelty is that the punishment site is also sent a copy of the victim. The punishment site uses a software bot or a human to animate the victim copy, which then fights the Predator, when he arrives.

A variant that is part of the current application is that GPT can be used to compute a copy of a typical victim. This GPT can run on the first site. It can combine in some manner the features of previous victims, to get some type of composite of the typical female victim preferred by the Predators on the first site. Then this GPT-derived avatar victim can be sent to the punishment site. Her attractiveness to him increases the chances that he had molested her, which is what we want, in order to punish him. When the Predator arrives at the punishment site, he is confronted with the victim. She then fights him. This can be effective even if the "victim" is being animated by a software bot or a person who works for the punishment site, and is not the person who originally inhabited the female. There is no way for him to tell.

Also, the punishment site can help this along. It might slow down or even make the Predator's limbs unresponsive, or just very slow to respond. The victim is not 'weighed' down. She can fight him and defeat him.

In answer to a possible query from the reader: When users use the first site, they can be required to agree to a Terms Of Service that includes agreeing to their avatars being selected. To derive a composite avatar (or even just pick 1 avatar) that is then sent to a punishment site to fight a Predator avatar. Given that the intent is to protect them from Predators, we suggest the TOS and its intent will be seen as benign.

A further variant is where the GPT finds multiple victims. These might be composites of actual victims. GPT then sends these picked victims to the punishment site. They jointly fight the Predator. Here, the intent is that the extra opponents of the Predator make for a more overwhelming group of antagonists. To put stress on him to desist.

When we said GPT in the previous paragraph, this might be extended to GPTs running on different and independent sites. Each GPT might pick a representative victim from its site. And the GPTs then upload these to the punishment site. The intent here is that if a Predator is active on one site, it might well be active on another. So we collect victims across all such sites. There is an asymmetry here. A Predator on one site, and controlled by a first human, might also correspond to a different looking Predator on a second site, also controlled by the first human. This anticipates that the human Predator will make several such Predator avatars. Whereas a human who uses sites for innocent purposes has less need to use different looking avatars.

5] Calibrating a Site that Uses GPT

Consider again FIG. 5. It shows how to use GPT and hyperlinks to protect women on a site. Implicit is that GPT is a program external to the site. We refer to a recent paper by Stephen Wolfram, "What is ChatGPT doing and why does it work?". (https://writings.stephenwolfram.com/2023/02/what-is-chatgpt-doing-and-why-does-it-work/). One key finding by researchers of GPT is that it is not deterministic. If we run GPT on a data set, we get a result. If we re-run GPT on that data set, we might get a new result. This presents a problem if we want to calibrate GPT in use with that data set.

FIG. 5 has a combination of GPT and hyperlinks. For the latter, every time we use these against a given Predator avatar, we get the same result—the Predator goes to a punishment site. For simplicity we then remove the link testing from this section. Though it should be added in during a full testing.

Suppose now we wish to integrate GPT with a site that has the methods described in this application (and earlier applications) to protect women (and men) from Predators on the site. This supposes that the site can hook up via APIs with GPT. Here, GPT refers to a system of code furnished by (eg) GOOGLE, MICROSOFT, OPEN AI etc. The site may want to devise a set of calibration code to be used periodically as a benchmark of the site against GPT.

The problem is using GPT against data that consists of a site containing (eg) avatars. Suppose we make a site with avatars placed in some manner in the site. There might be Predator avatars, female non-Predator avatars and male non-Predator avatars. The latter 2 types we will simply call female avatars and male avatars. These 3 types of avatars can be started at various locations in the site. Some avatars might start at a static, standing position. Other avatars might start by moving in some directions. FIG. 9 is a flow chart outlining this section. Item 91 defines the actors—Predators, females, males.

We should storyboard the actions of the avatars. See item 92. For example, a Predator Alpha might go up to an avatar Jane and make a rude gesture and 2 rude remarks. Where here a "rude gesture" is a specific rude gesture. And similarly, the 2 rude remarks are explicitly defined. The GPT is listening in. It presumably can detect the rude gesture and the 2 rude remarks.

Predator Beta goes up to avatar Susan and makes a rude written remark. The GPT can presumably also detect this.

The crucial reason for defining the actions of the avatars, and especially the Predators' actions, is so that we know a priori what the totals for the rude actions are. This establishes the ground truth against which we can measure the efficacy of the GPT. In general, for the "regular" female and male avatars in this simulation (or test), they do not do rude actions against each other or against the Predators. The actions that a copy of a victim might do against a Predator in a punishment site are considered to be a special case. Item 93 is where the ground truth is defined, once we know the actors' script. This item is done manually. It can be done quickly. The GPT is not used at this point.

We suggest that a group following our suggestions consider involving someone from the film industry who has directed live action films. She will be versed in defining explicitly the steps made by the human actors, and this carries over to our online cases.

Note that in a given choice of simulation, it might only include 1 or 2 of the (rude gestures, rude spoken words, rude written words). For example, you might have a site where users cannot express themselves in written words, rude or otherwise. We include all 3 types in FIG. 9 for more generality.

Item 94 is the starting of the "acting" and GPT.

At some point, the testing ends, as in item 95. All the avatars are stopped. The site can ask the GPT for (eg) how many rude gestures, how many spoken bad remarks, and how many written bad remarks it found. This should be done so that with a defined group of avatars and defined actions, we can get a benchmark for how the GPT performs. Item 96 is the finding of this derived ground truth. It differs from item 93, because item 96 is found by running the GPT.

For simplicity, we might have the Predators NOT grope any of the female or male avatars. So none of the Predators are sent to the punishment site. We are just testing the GPT.

The site does a full recording of the avatars. Assume this happens at the date 15 January of the current year. Now suppose the date is 11 February. Maybe we or the firm who owns the GPT made changes to it. We want to see if now running GPT on our site, using the same starting point of 15 January, will see any difference. Maybe the 11 February run can now detect different totals of rude gestures, rude speech, rude writings for the entire system. Thus the calibration gives us a simple way to handle the indeterminism or the upgrading of GPT. And the calibration can aid when or if we upgrade the VR site itself and we wish to check what we have done.

Item 97 compares the (eg) 11 February results with the 15 January results. And implicitly, item 97 can compare the 15 January results with a possible earlier and first result (aka the first ground truth).

The site might have a reset or test button implemented. Pressing this launches the initial configuration of the site in item 94. This greatly aids the testing process.

Collectively, steps 94-97 might be done occasionally, at irregular intervals, but sufficiently to reassure the site and its visitors/customers that any changes it makes are benign.

6] Generalizing

The earlier sections focused on female victims of a male Predator character. In general, of course, the Predator can be any gender. And ditto for the victims. But from reports filed in social media, we make the assumption that most Predators are run by men, and most victims are women.

I claim:

1. A system of using a Generative Pre-trained Transformer (GPT) and hyperlinks to protect users from an online predator, comprising:
   a computer configured with the GPT and
   a multiuser environment where the users each control a character in a first site;
   the GPT trained to detect rude gestures by a second character in the environment;
   the GPT trained to detect rude spoken words by the second character;
   the GPT trained to detect rude written words by the second character;
   where if the GPT detects a rude gesture, the computer blurs or deletes the gesture;
   where if the GPT detects rude spoken words, the computer alters the words;
   where if the GPT detects rude written words, the computer does one of:
   redacts the rude written words,
   marks the rude written words with a strikethrough,
   replaces the offending words with a self-insult referring to the second character; or
   replaces the offending words with words praising the character that the second character was insulting; and wherein
      the computer puts hyperlinks on the character on areas where the character is wearing underwear linking to a punishment site separate from the first site;
      the hyperlink being triggered by being touched by the second character;
   when the second character is sent to the punishment site, the punishment site shows audio and video to the second character, the audio and video being repulsive to many humans.

2. The system of claim 1, where the multiuser environment comprises a Virtual Reality (VR) scenario.

3. The system of claim 2, where the VR scenario is a Multiverse where the character is an avatar.

4. The system of claim 1, where the audio comprises the sound of fingernails on a blackboard.

5. The system of claim 1, where the computer makes and animates one or more Watcher characters;
   where the one or more Watcher characters move through the multiuser environment;
   where the one or more Watcher characters surveil actively controlled characters;
   where when a Watcher of the one or more Watcher characters observes a first actively controlled character groping a second actively controlled character;
   the computer uses video of the Watcher observing the groping to determine if groping was done.

6. The system of claim 1, where when the GPT detects a character making a rude gesture with a limb of the character the computer paralyzes the limb for a duration of time.

7. The system of claim 6, where the duration of paralysis is calculated by a survey of complaints against the character, where more complaints results in the duration of time being made longer.

8. The system of claim 1, where when the GPT detects a character making a rude gesture with a limb, the computer deforms the limb for a duration of time.

9. The system of claim 1, where when the GPT detects a character showing a sole of one of its shoes to another character, the computer removes the shoe for a duration of time.

10. The system of claim 9, where the computer removes both shoes of the character for a duration of time.

11. The system of claim 1, where when the GPT detects rude spoken words, the computer makes the character mumble the words.

12. The system of claim 11, where the computer makes the character's face appear deformed, to dissuade others from being close to that character.

13. The system of claim 1, where the GPT is trained on data from users in UK and/or Australia;

where when the GPT detects a rude gesture made with fingers of a hand, the computer deforms or paralyzes the hand.

14. The system of claim 1, where the GPT is trained on detecting if a user had a previous character on the current site or on another site that was detected to be an online predator;

where the computer is configured to reject a current character of the user or impose a modification or legacy handicap on the current character.

15. The system of claim 14, where the computer is configured to impose a period of silence on the current character.

16. The system of claim 1, where when the GPT detects rude written words from a character, the computer replaces the rude written words with one of:

innocuous words, words making the character appear stupid, or words praising another character.

* * * * *